United States Patent
Baumgartner et al.

(10) Patent No.: US 9,599,176 B2
(45) Date of Patent: Mar. 21, 2017

(54) DISC BRAKE HAVING A RESTORING DEVICE AND A BRAKE PAD

(71) Applicant: KNORR-BREMSE Systeme fuer Nutzfahrzeuge GmbH, Munich (DE)

(72) Inventors: Johann Baumgartner, Moosburg (DE); Alexander Werth, Munich (DE); Robert Weggartner, Pfarrkirchen (DE); Rudolf Kielbasa, Karlsfeld (DE); Tobias Fishchl, Vilshofen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 190 days.

(21) Appl. No.: 14/496,911

(22) Filed: Sep. 25, 2014

(65) Prior Publication Data

US 2015/0008080 A1    Jan. 8, 2015

Related U.S. Application Data (63) Continuation of application No. PCT/EP2013/055887, filed on Mar. 21, 2013.

(30) Foreign Application Priority Data

Mar. 26, 2012    (DE) .......................... 10 2012 102 584

(51) Int. Cl.
*F16D 55/22* (2006.01)
*F16D 65/097* (2006.01)
(Continued)

(52) U.S. Cl.
CPC ....... *F16D 65/0973* (2013.01); *F16D 55/226* (2013.01); *F16D 65/092* (2013.01);
(Continued)

(58) Field of Classification Search
CPC .. F16D 55/225; F16D 55/226; F16D 55/2262; F16D 65/02; F16D 65/092;
(Continued)

(56) References Cited

U.S. PATENT DOCUMENTS 5,687,817 A    11/1997    Kobayashi et al.
7,798,294 B2    9/2010    Iraschko
(Continued)

FOREIGN PATENT DOCUMENTS

DE    24 36 541 A1    2/1976
DE    22 30 949 C3    11/1981
(Continued)

OTHER PUBLICATIONS

International Preliminary Report on Patentability (PCT/IB/326 & PCT/IB/373), including Written Opinion (PCT/ISA/237) dated Oct. 9, 2014 with English-language translation (twelve (12) pages).
(Continued)

*Primary Examiner* — Robert A Siconolfi
*Assistant Examiner* — Mahbubur Rashid
(74) *Attorney, Agent, or Firm* — Crowell & Moring LLP (57) ABSTRACT

A disc brake for a motor vehicle has a brake application device, a floating caliper that reaches over a brake disc, preferably a lining wear adjustment device, and a brake carrier having guiding surfaces opposite each other in the circumferential direction of the brake disc. Between the guiding surfaces, on the brake application side and the reaction side of the brake disc, at least one respective brake pad having a lining carrier and having at least one friction lining is guided movably parallel to an axis of rotation of the brake disc and can be actuated by a brake application force. At least one restoring device which supports at least the reaction-side brake pad on the brake carrier via the lining carrier, wherein the restoring device includes at least two
(Continued)

restoring elements, which are attached to the lining carrier of at least the reaction-side brake pad in such a way that the restoring elements are guided movably parallel to the axis of rotation of the brake disc.

18 Claims, 10 Drawing Sheets

(51) Int. Cl.
*F16D 55/226* (2006.01)
*F16D 65/18* (2006.01)
*F16D 65/092* (2006.01)
*F16D 121/02* (2012.01)
*F16D 127/02* (2012.01)

(52) U.S. Cl.
CPC ......... *F16D 65/0972* (2013.01); *F16D 65/18* (2013.01); *F16D 2121/02* (2013.01); *F16D 2127/02* (2013.01)

(58) Field of Classification Search
CPC ............... F16D 65/097; F16D 65/0972; F16D 65/0973; F16D 65/18; F16D 2127/02
USPC ....................................................... 188/72.3
See application file for complete search history.

(56) References Cited

U.S. PATENT DOCUMENTS

| | | |
|---|---|---|
| 2004/0016610 A1 | 1/2004 | Morris |
| 2010/0000828 A1 | 1/2010 | Pericevic et al. |

FOREIGN PATENT DOCUMENTS

| | | | |
|---|---|---|---|
| DE | 196 23 867 A1 | 1/1998 | |
| DE | 103 20 605 B3 | 11/2004 | |
| DE | 10 2007 001 213 B4 | 9/2008 | |
| DE | EP 2644926 A1 * | 10/2013 | ........... F16D 55/225 |
| EP | 1 717 476 A1 | 11/2006 | |
| GB | 994827 | 6/1965 | |
| GB | 1 373 817 | 11/1974 | |
| WO | WO 03/027526 A1 | 4/2003 | |

OTHER PUBLICATIONS

International Search Report (PCT/ISA/210) dated Jun. 12, 2013, with English translation (Seven (7) pages).
German Office Action dated Nov. 5, 201 (Seven (7) pages).

\* cited by examiner

Fig. 9

DISC BRAKE HAVING A RESTORING DEVICE AND A BRAKE PAD

CROSS REFERENCE TO RELATED APPLICATIONS

This application is a continuation of PCT International Application No. PCT/EP2013/055887, filed Mar. 21, 2013, which claims priority under 35 U.S.C. §119 from German Patent Application No. 10 2012 102 584.3, filed Mar. 26, 2012, the entire disclosures of which are herein expressly incorporated by reference.

BACKGROUND AND SUMMARY OF THE INVENTION

The invention relates to a disc brake, in particular for a motor vehicle, having a brake application device, a brake caliper, in particular a sliding caliper which straddles a brake disc, preferably a lining wear adjusting device, and a brake carrier with guide faces which lie opposite one another in the circumferential direction of the brake disc. The invention also relates to a corresponding brake pad.

Disc brakes of this type are usually actuated pneumatically by compressed air and are equipped with automatically acting, mechanical lining wear adjusting devices. The lining wear adjusting devices reduce an air play (gap) which has become too large due, for example, to the wear of the brake pad or brake disc.

In the case of combined heavy trucks (such as tractor-trailer combinations), residual grinding torques of the wheel brakes, in particular of disc brakes, can increase fuel consumption by up to 1%. Moreover, increased brake pad wear occurs as a consequence of the constant grinding of the brake pads, as a result of which the maintenance costs of the vehicle are increased. A cause of said residual grinding torques is an incomplete release of the brake pads from the brake disc after a braking operation.

In order to avoid said residual grinding torque, it is necessary to produce a minimum air gap (minimum air play) between the friction faces of the brake pads and the brake disc friction face during release of the brake after a preceding braking operation by actively withdrawing the brake pads. Different methods are known for this purpose.

In the case of fixed caliper disc brakes which have a fixed position of the brake caliper and brake disc, it is sufficient to connect the brake pads to the actuating piston, which acts on the respective brake pad, in such a way that, during release of the brake, the actuating pistons also drive the brake pads in their withdrawal movement. In this way, the air play between the brake pads and brake disc is re-established. The avoidance of residual grinding torque to a great extent is possible by way of this measure in the case of fixed caliper disc brakes.

In the case of sliding caliper disc brakes, in contrast, sufficient release of the brake pads cannot be achieved solely by way of a withdrawal-capable attachment of the brake pads to the actuating pistons or to the caliper backs, since the brake caliper remains freely movable in its sliding guide. This can lead to one of the two brake pads, as a rule the caliper-side brake pad, still remaining in grinding contact with the brake disc.

In the case of sliding caliper disc brakes, it is therefore taken into consideration to impart a position which is, as it were, fixed to the brake caliper in the non-actuated state with the aid of clamping elements which are arranged on the sliding guides, as a result of which it is made possible to set the air play on both sides. This is illustrated by DE 10 2007 001 213 B4. This solution is relatively complicated and can be susceptible to disruption. In particular in the application in disc brakes which are actuated by compressed air for heavy commercial vehicles, this can be affected by influences which are variable within broad limits as a result of component tolerances and component deformations, which stands in the way of the application of said method (lining compressibility, wear state of the linings, caliper deformation, actuation force of the adjusting device, clamping force of the clamping ring, force of the restoring spring).

DE 22 30 949 C3 describes a brake pad guide for a partially lined disc brake, in which the influence of the sliding caliper and therefore of its component tolerances is largely ruled out. Here, the brake pad is supported directly in a frictionally locking manner via clamping elements against the guide faces of the stationary brake carrier. Upon actuation of the brake, the clamping elements are held on the guide faces as a result of the spreading force of a leaf spring, whereas the brake pad can perform a limited movement under the action of the actuating force of the brake, in order to come into sufficient frictional contact with the brake disc. After the brake actuation, the brake pad is pulled back into its starting position by way of the leaf spring which is fastened firstly on the brake pad and secondly on the clamping elements, and the air play is thus produced. If lining and/or brake disc wear occurs, the lining carrier plate reaches the stops on the travel limiting means of the clamping elements in the case of brake actuations, as a result of which the clamping elements are displaced in the direction of the brake disc under the action of the actuating force of the brake counter to their clamping force by an amount which corresponds to the wear which has occurred.

This method, which seems to be simple and practicable, has also not found any significant application. The clamping elements can be susceptible to contamination and corrosion. If vibrations occur, they can be subjected to pronounced loadings by the brake pad. In addition, the clamping elements can impair the action of the brake as a result of rusting up/blocking This solution is therefore not suitable for application in heavy commercial vehicles.

The object of the present invention consists in providing an improved disc brake.

It is a further object to provide an improved brake pad for a disc brake.

The disc brake according to the invention has, in each case, one restoring device for at least the reaction-side brake pad, the release function of which restoring device is not influenced by the brake caliper. The restoring devices have a simple construction and high robustness. A disruption in the action of the restoring devices does not cause the disc brake to be influenced. The disc brake can be actuated by compressed air and is particularly suitable for heavy commercial vehicles, residual grinding torques and unnecessary brake pad wear being avoided.

A disc brake according to the invention, in particular for a motor vehicle, comprises a brake application device, a brake caliper, in particular a sliding caliper, which straddles a brake disc, preferably a lining wear adjusting device, a brake carrier with guide faces which lie opposite one another in the circumferential direction of the brake disc, between which guide faces in each case at least one brake pad with a lining carrier is guided displaceably parallel to a rotational axis of the brake disc on both sides of the brake disc and can be actuated by a brake application force, and in each case one restoring device which supports at least the reaction-side brake pad with the lining carrier on the brake carrier. Each restoring device comprises at least two restoring elements which are attached on the lining carrier of at least the rear-side brake pad such that they can be guided displaceably parallel to the rotational axis of the brake disc.

As a result of the application of suitable restoring elements, further components which are susceptible to disruption, such as clamping elements, can be avoided and the number of components is reduced.

It is provided according to one advantageous design variant that the restoring elements are configured as sleeves which are mounted in receptacle holes of the lining carrier such that they can be displaced parallel to the rotational axis of the brake disc, from which sleeves in each case one restoring head, which can be restored elastically counter to a predefined force, protrudes toward the brake disc. The restoring head can be supported on a supporting face which protrudes from the guide faces in the circumferential direction of the brake disc. Releasing of the brake pad after the brake operation has taken place is made possible in a simple way via the restoring head which is supported in the sleeves.

The receptacle holes are preferably provided in depressions which are formed on the lining carrier on the outer edge regions in the circumferential direction of the brake disc, in order to provide sufficient installation space for the restoring head and the elastic elements and its support, even in the case of advanced wear of the friction linings of the brake pad.

In order to keep the friction lining area which acts on the friction face of the brake disc as great as possible, each of the friction linings of the brake pad is configured in each case with cutouts. These cutouts reach at least partially around the restoring elements.

The outer casing of the restoring elements is advantageously configured as a clamping sleeve. This ensures, firstly, a secure seat of the restoring elements in the lining carrier and, secondly, also the necessary displaceability of the restoring elements in the receptacle holes of the lining carrier.

It is also contemplated in an alternative design variant that the outer casing of the restoring element is provided with a knurled portion which is displaced further and further away from the brake disc through the receptacle hole of the lining carrier in the case of increasing lining wear. This variant likewise makes a secure seat and the necessary displaceability of the restoring element possible.

The restoring head preferably has a pressing face, and an axle body which protrudes into the outer casing perpendicularly with respect to the pressing face. The axle body is held in an oversprung manner in the outer casing according to one design variant.

In an alternative design variant, the axle body is supported on at least one spring, in particular a helical or disc spring, which is mounted in the outer casing.

In order to limit the displacement of the restoring head into the outer casing of the restoring element, the pressing face can preferably be supported on an end side of the outer casing, which end side faces the supporting face.

In order to ensure both the release of the brake pad from the brake disc and the adjustment of the restoring elements as a consequence of the friction lining wear, the restoring elements are held in a stationary manner in the lining carrier up to a force which acts parallel to the rotational axis of the brake disc and is smaller than the brake application force which is applied by the brake application device in the case of a braking operation. As a result, during the brake application in the case of a braking operation, each of the restoring elements can be pushed correspondingly in the receptacle hole of the lining carrier to a position, in which the friction lining bears against the brake disc and the restoring head bears against the supporting face of the brake carrier. After the braking operation or the brake application of the brake has ended, the prestressing force of the restoring head acts in the outer casing of the restoring element in such a way that the brake pad is pressed back from the brake disc and presses the brake pad back into its starting position with the re-establishment of an air play between the brake pad and brake disc.

In a further advantageous design variant, the restoring devices have restoring forces of different magnitude on different sides of the brake disc. This can result in a uniform division of the two-sided air plays.

Moreover, the restoring elements, which are configured as sleeves, can additionally also be configured with a different stiffness characteristic, for example, by way of the selection of the spring. This makes it possible that the restoring element with the larger stroke registers a more pronounced drop in force, as a result of which an action which equalizes the air plays occurs.

A corresponding brake pad of a disc brake is equipped with an above-described restoring device.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the figures, terms such as top, bottom, left, right, front, back, etc. relate exclusively to the exemplary illustration selected in the respective figures and the position of the disc brake, the brake pad, the restoring element and the like. These terms are not to be understood to be restrictive, that is to say the references can change as a result of different work positions or the mirror-symmetrical design or the like.

Figure 1:
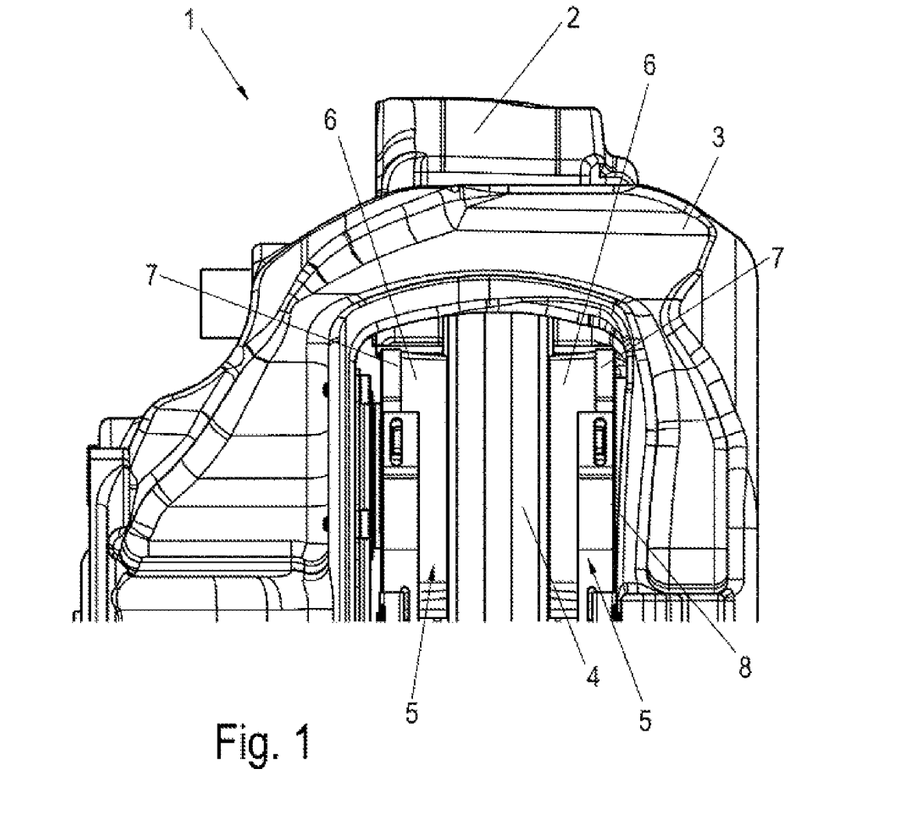
FIG. 1 is a diagrammatic plan view of a partial section of one design variant of a disc brake according to the invention.

In FIG. 1, one exemplary embodiment of a disc brake according to the invention is identified overall by the designation 1. The disc brake 1 has a brake application device, and a brake caliper 3 which reaches over or straddles a brake disc 4 and is preferably configured as a sliding caliper. Furthermore, the disc brake 1 preferably has a lining wear adjusting device for regulating the air play between the brake disc 4 and the brake pads 5. The brake pads are arranged on both sides of the brake disc 4. Each brake pad 5 has a lining carrier 7 and at least one friction lining 6. Here, the brake pads 5 are guided in a brake carrier 2 such that they can be displaced parallel to a rotational axis of the brake disc 4. The brake pad carrier has guide faces 21 forming a mounting shaft for the brake pads. The guide faces 21 lie opposite one another in the circumferential directions of the brake disc 4. The brake pads 5 can be actuated by a brake application force. The disc brake 1 can be configured, for example, as a disc brake 1 which is actuated by compressed air.

Each of the brake pads 5 is guided parallel to the rotational axis of the brake disc 4 in a reversibly displaceable manner between the guide faces 21 of the brake carrier 2. The longitudinal direction of the lining carrier 7 runs tangentially with respect to the brake disc 4. Perpendicularly with respect to said longitudinal direction, the lining carrier 6 extends in the radial direction of the brake disc 4.

The friction face of the brake disc 4 lies opposite (faces) the lining friction face of the brake pad 5. Here, a spacing between the brake pad 5 or between the brake pads 5 and the brake disc 4 is called an air play or gap. In the case of a braking operation, upon actuation of the disc brake 1, first of all the air play is bridged, by the brake pad 5 being applied from its starting position against the brake disc 4 in the brake application direction, in which a brake application force Z also acts. Here, the air play is increased on account of the wear of the friction linings 6 of the brake pads 5 and of the brake disc 4.

As soon as the air play is bridged during the application of the disc brake, the further application brings about a braking operation by way of pressing of the brake pads onto the brake disc 4.

If the brake application device is released, a restoring device for restoring the brake pads 5 from their applied position into a released position serves to re-establish the air play between the brake pads 5 and the brake disc 4. An adjustment of the brake pads 5 on account of wear in order to set the air play to a previously fixed value is performed, for example, by a wear adjusting device which is not to be explained further here.

The restoring device, which supports at least the reaction-side (rear-side) brake pad 5 with the lining carrier 7 on the brake carrier 2 comprises at least two restoring elements. These restoring elements are attached to the lining carrier 7 of at least the reaction-side brake pad such that they are guided displaceably parallel to the rotational axis of the brake disc 4.

The application-side brake pad 5 is preferably also equipped with two or more restoring elements. However, the application-side brake pad 5 can also be released from the brake disc 4 during the release of the disc brake 1 by way of a connection to the pressure pieces of the brake application device.

As shown in FIGS. 2 to 8, the restoring elements 9, 9', 9" are configured as sleeves which are mounted in receptacle holes 72 of the lining carrier 7 such that they can be displaced parallel to the rotational axis of the brake disc 4. From the sleeves, in each case, one restoring head 94, 94", which can be restored elastically counter to a predefined force, protrudes toward the brake disc 4. The restoring head 94, 94" can be supported on a supporting face 22 which protrudes from the guide faces 21 in the circumferential direction of the brake disc 4.

Figure 5:
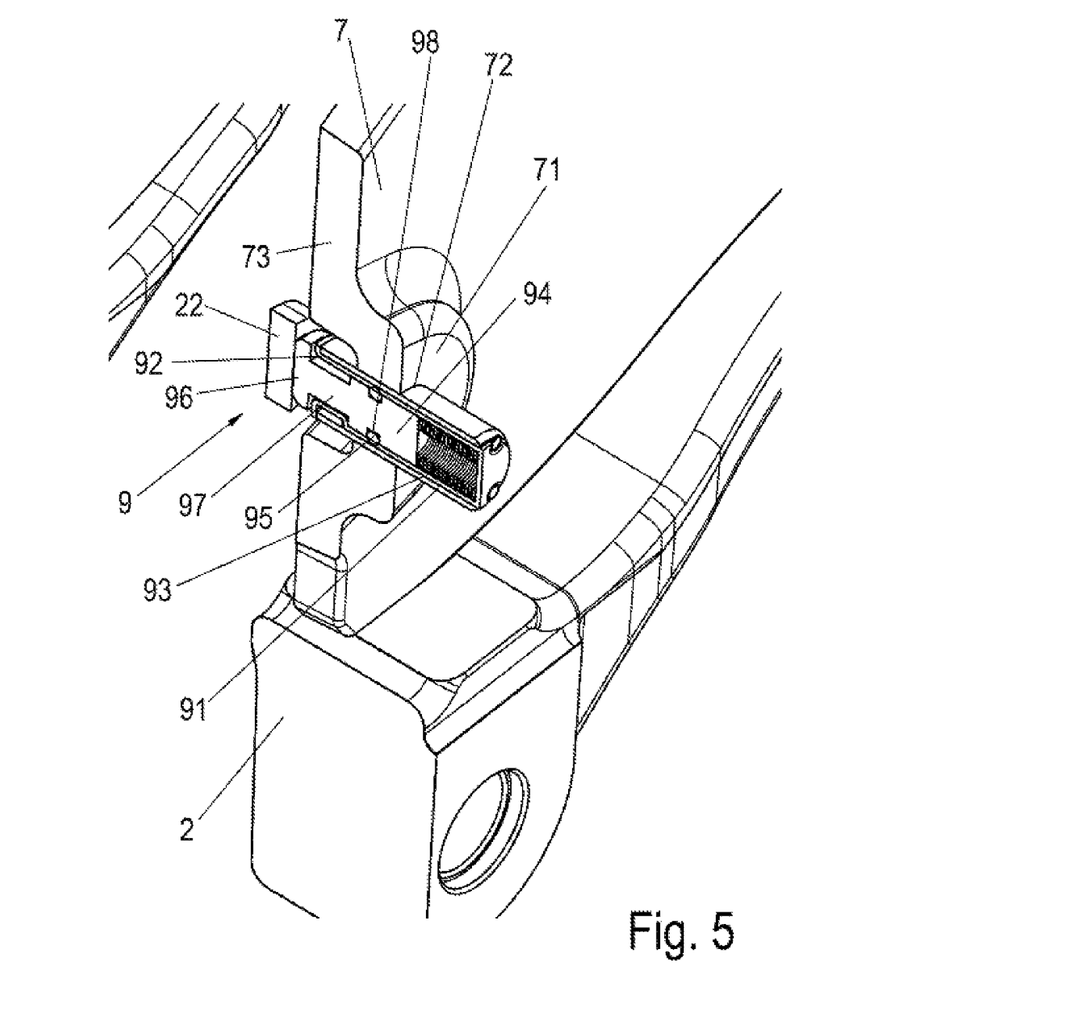
Figure 6:
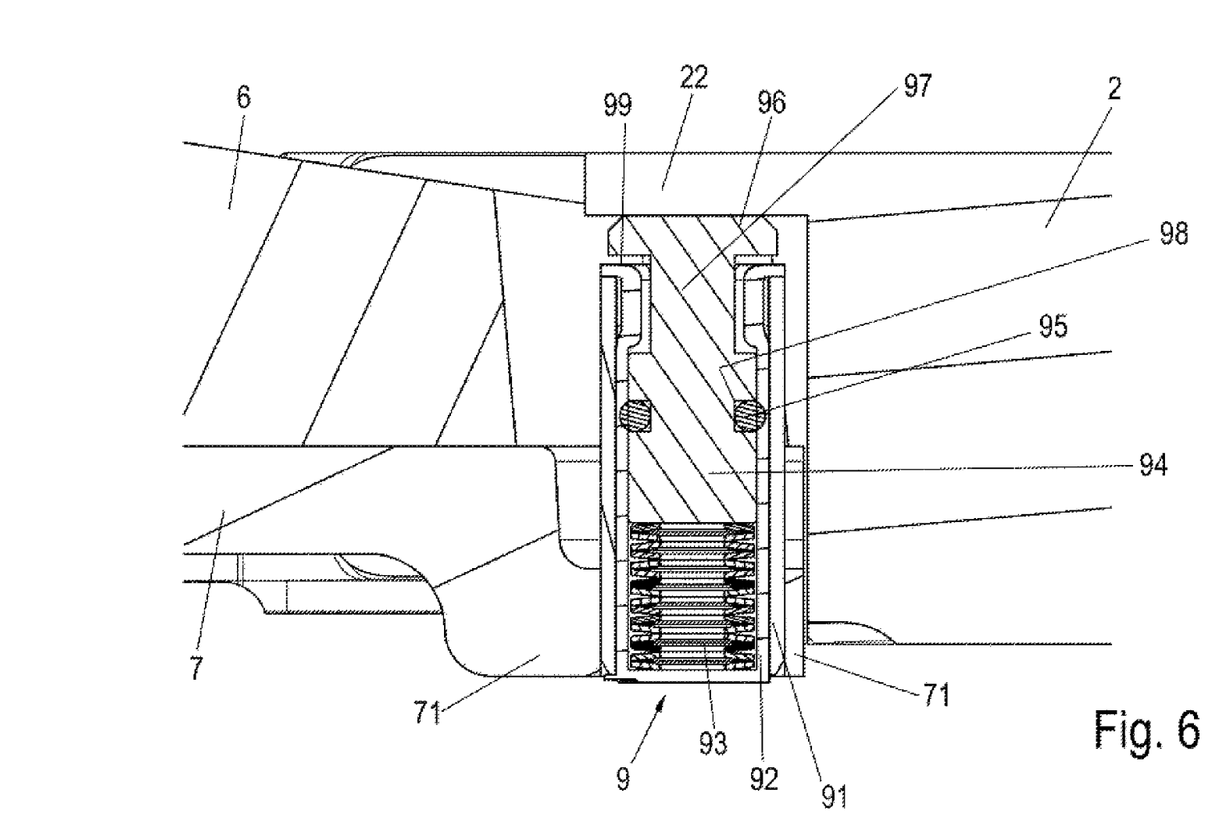
FIG. 6 is a diagrammatic sectional view of the restoring element from FIG. 5, which is arranged in the lining carrier of a brake pad.
Figure 7:
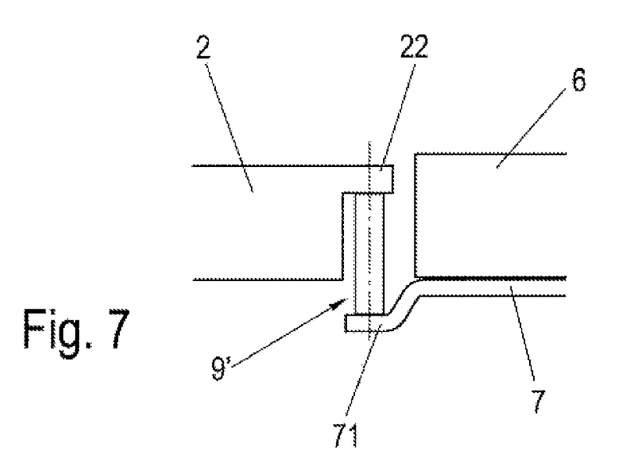
FIGS. 7 and 8 are diagrammatic views of further design variants of a restoring element.
Figure 8:
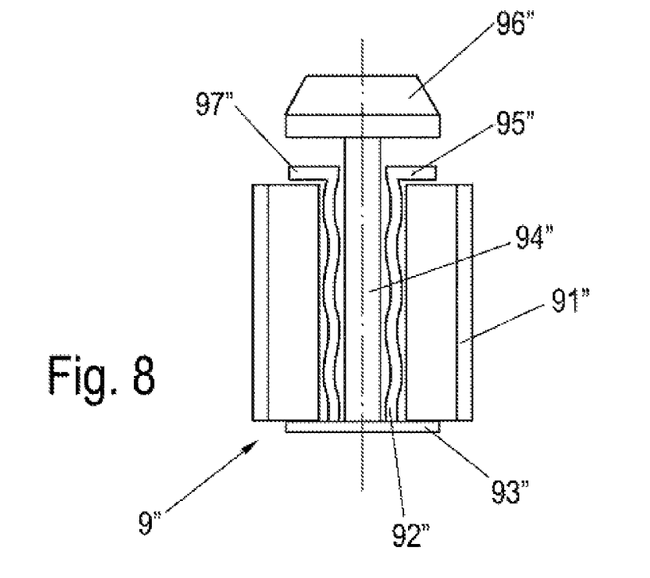

Here, FIGS. 2 to 6 show a first design variant of the restoring elements 9, whereas FIGS. 7 and 8 in each case show alternative design variants of a restoring element 9', 9" of this type.

Making reference to the design variant according to FIGS. 2 to 6 and 9 to 11, the receptacle holes 72 are provided in a lining carrier 7 on depressions 71, preferably offsets, which are formed on the outer edge regions in the circumferential direction of the brake disc 4. Here, the depressions 71 are formed away from the friction lining material 6, in order for it to be possible to bring about a stroke which is necessary to press the brake pad away even in the case of virtually completely worn friction linings 6.

Figure 2:
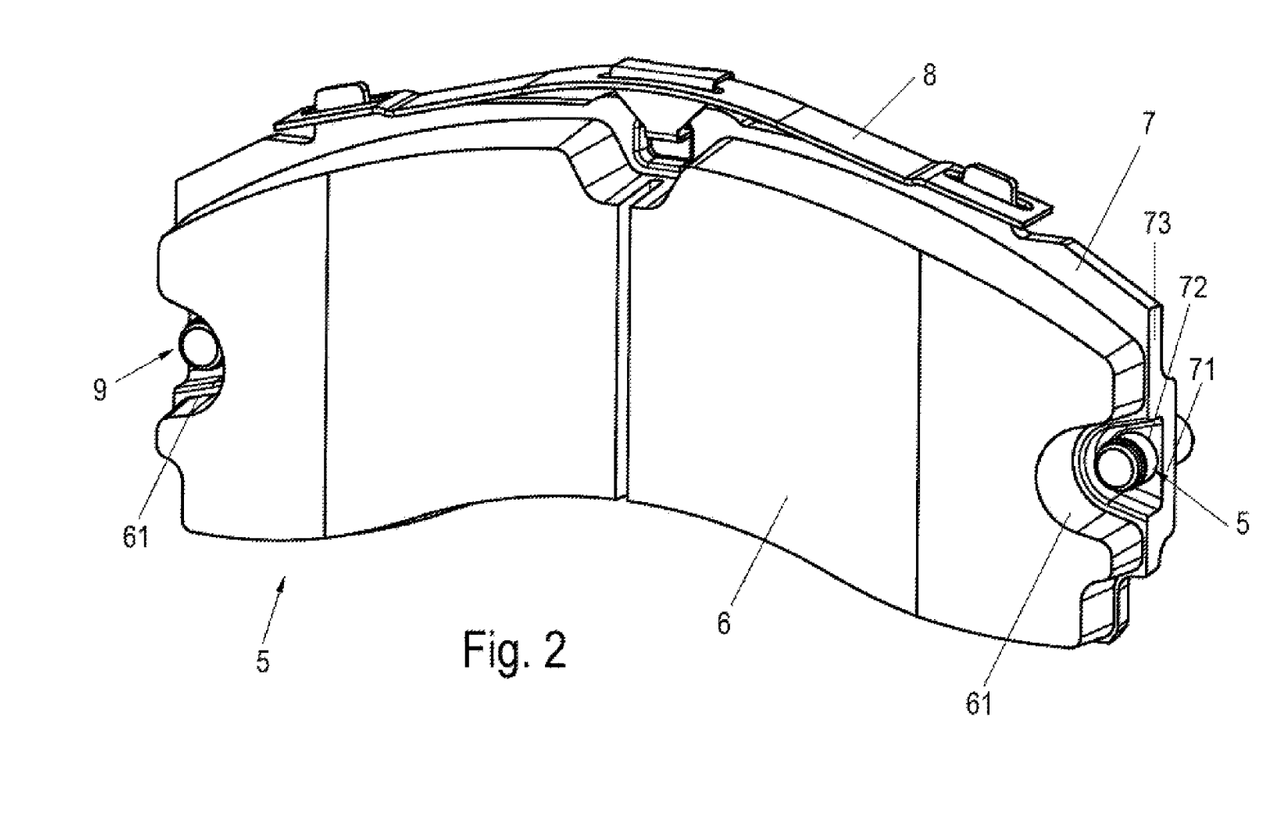
FIG. 2 is a perspective illustration of a brake pad with restoring elements.
Figure 3:
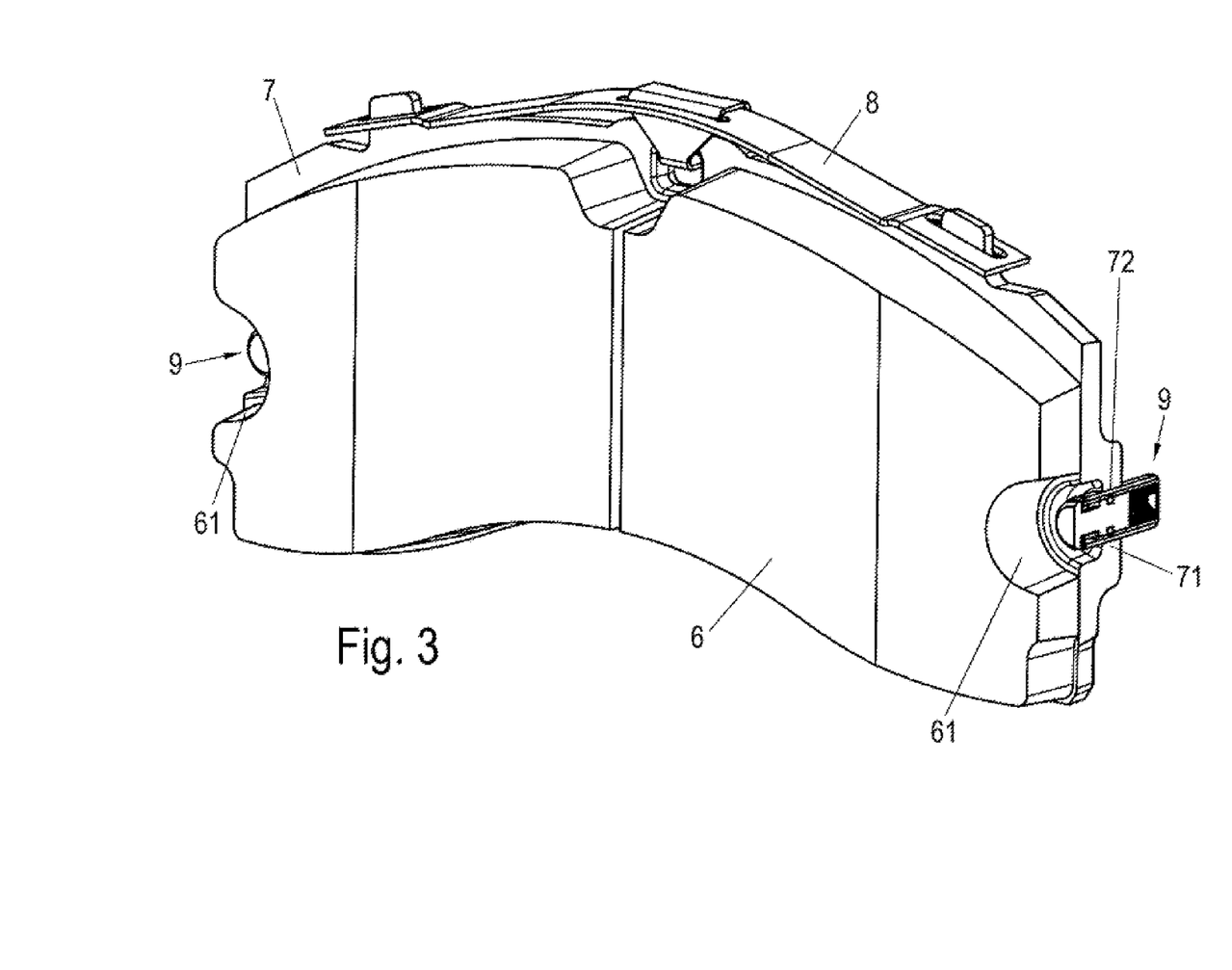
FIG. 3 shows the brake pad from FIG. 2 with a cut-away restoring element.

The friction linings 6 are preferably configured with cutouts 61 which extend around the restoring elements 9 at least partially, in order to obtain as large a friction area as possible despite the installed restoring elements 9.

Figure 4:
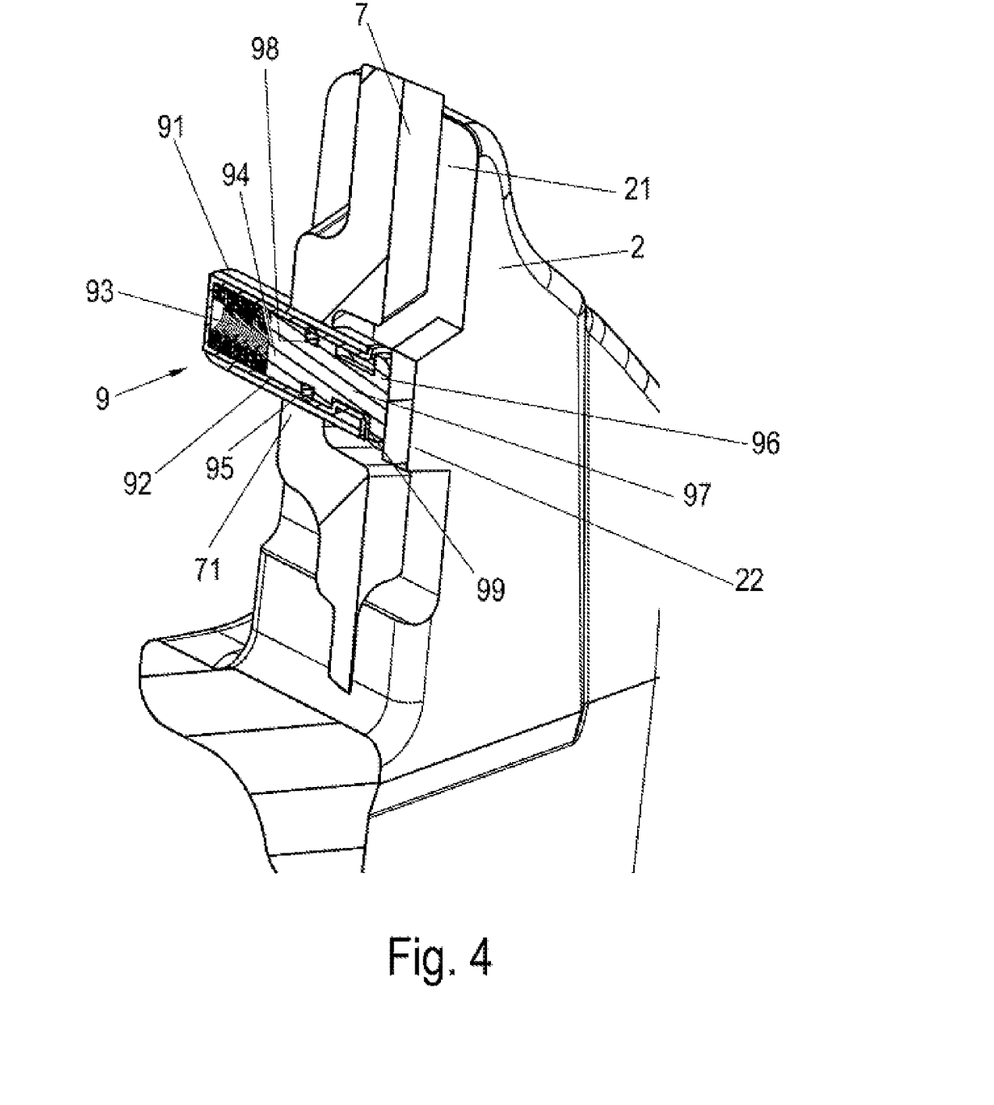
FIGS. 4 and 5 are different perspective detailed views of a restoring element of a brake lining, which restoring element is supported on a brake carrier.

As can be seen in FIGS. 4 to 6, an outer casing 91 of the restoring element 9 is preferably configured as a clamping sleeve, which is firstly thus fixed firmly in the lining carrier 7, in order to press the brake pad 5 away from the brake disc 4 without displacement, but at the same time can be displaced in the receptacle hole 72 of the lining carrier 7 by way of the action of relatively high axial forces, as are exerted in the case of a brake application operation by the brake application device, usually of forces greater than 500 N.

Instead of the configuration as a clamping sleeve, the outer casing 91 of the restoring element 9 can also be provided with a knurled portion which can be displaced relative to the lining carrier 7 in the receptacle hole 72 in the case of increasing lining wear.

Furthermore, the restoring element 9 has a pressing face 96 and an axle body 97 protruding into the outer casing 91 perpendicularly with respect to the pressing face 96 and, in the design variant shown in FIGS. 4 to 6, is supported on at least one spring 93 which is mounted in the outer casing 91, in particular a helical spring or one or more disc springs.

The axle body 94 preferably has a cutout or groove 98 for receiving a seal 95, for example in the design of an O-ring. The seal 95 is supported on its outside on a sleeve element 92. The sleeve element 92 reaches around the axle body 94 and is provided with a rolled-in portion in a region below the pressing face 96, which region lies perpendicularly with respect to the axle body 94. An upper end of the sleeve element 92 is curved parallel to the pressing face 96 and is supported on that end face of the outer casing 91 which faces the pressing face 96.

In the alternative design variant (shown in FIG. 8) of the restoring element 9", the restoring body 94" is held via springs 92" on the outer casing 91". Here, an extension 95" of the spring 92" is brought about by pressing of the pressing face 96" onto the supporting face 22 of the brake carrier, which spring 95", after a braking operation has taken place, releases the brake lining from the brake disc 4 by way of pressing out of the supporting face 96" with respect to the outer casing 91" which is fixed sufficiently firmly on the lining carrier. The spring 95" springs back into its starting position which is shown in FIG. 8. The prestress of said spring 95" is achieved by virtue of the fact that it is fixed on a counterplate 93" on an end side of the outer casing 91" which lies opposite the pressing face 96".

Figure 9:
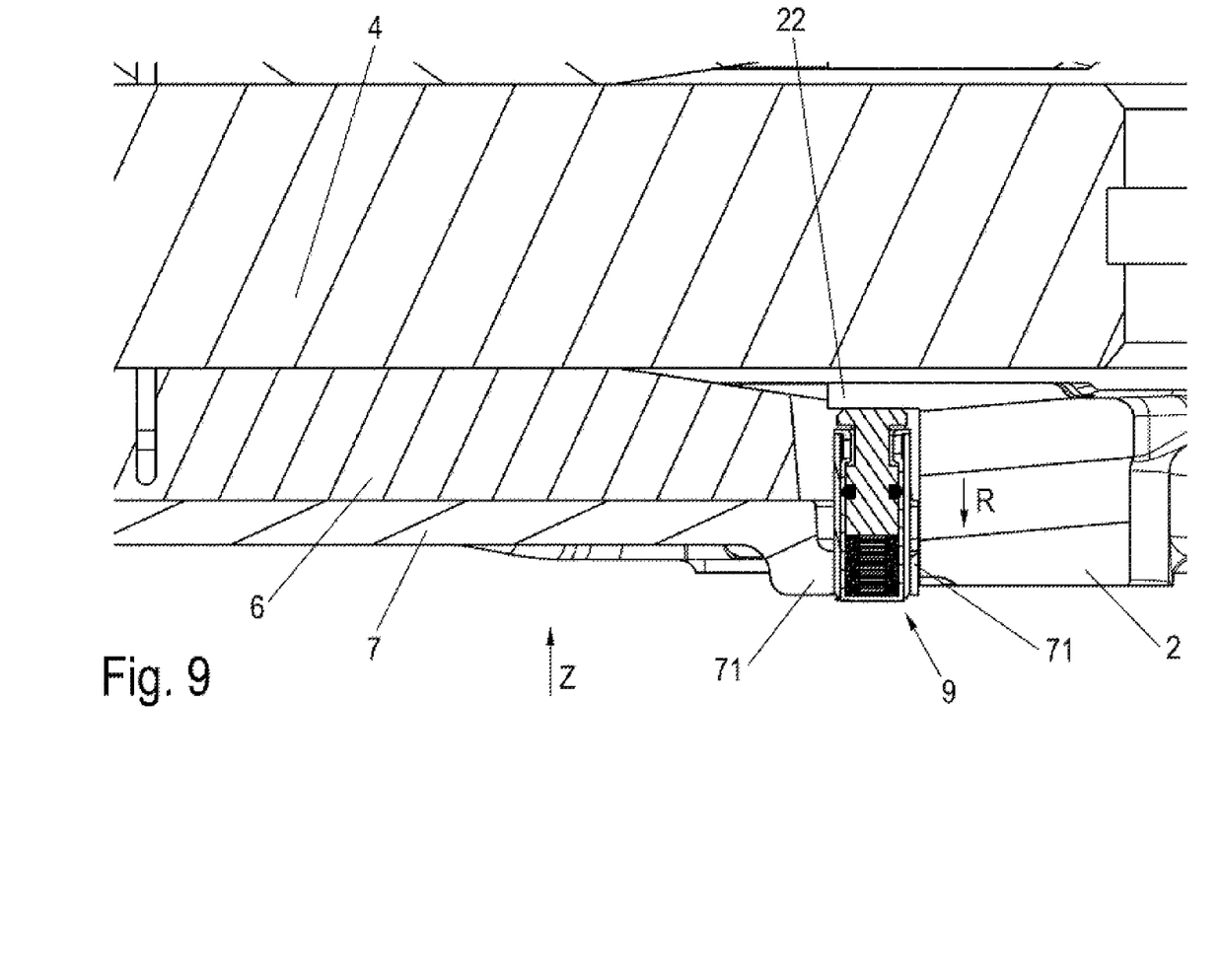
FIGS. 9 to 11 are diagrammatic sectional views of a restoring element which is supported on a brake carrier and is arranged in the lining carrier of a brake pad, with friction linings of the brake pad which are worn to different degrees.
Figure 10:
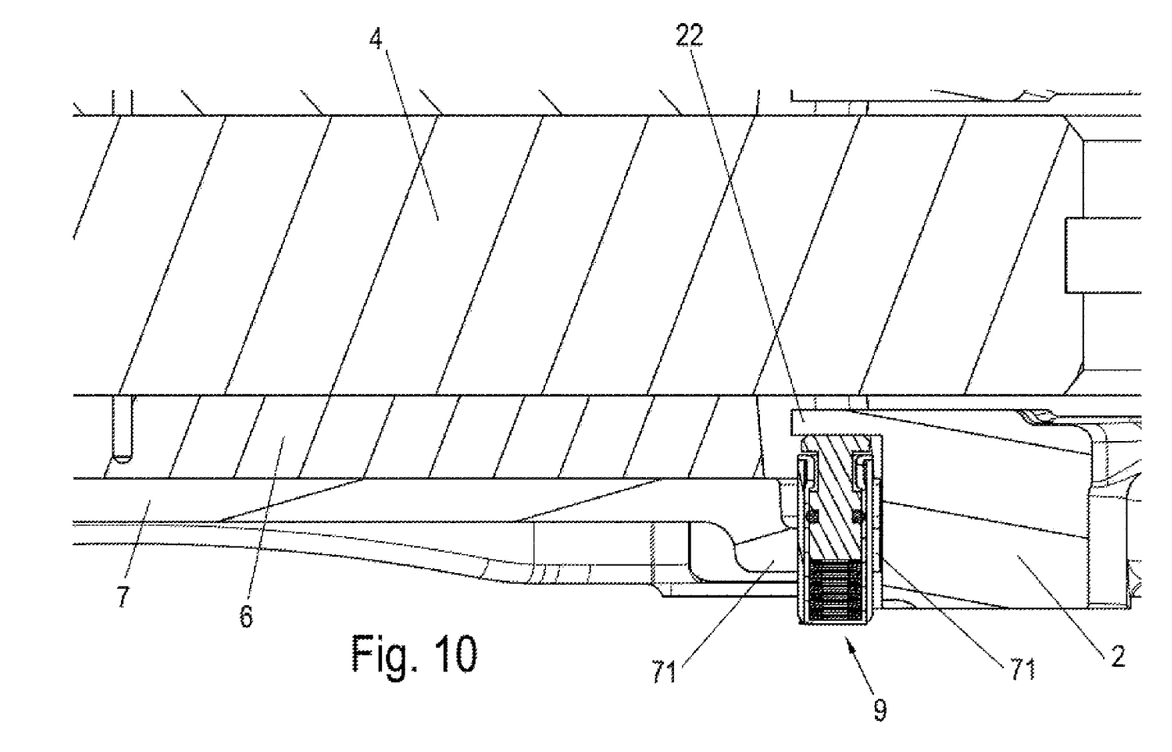
Figure 11:
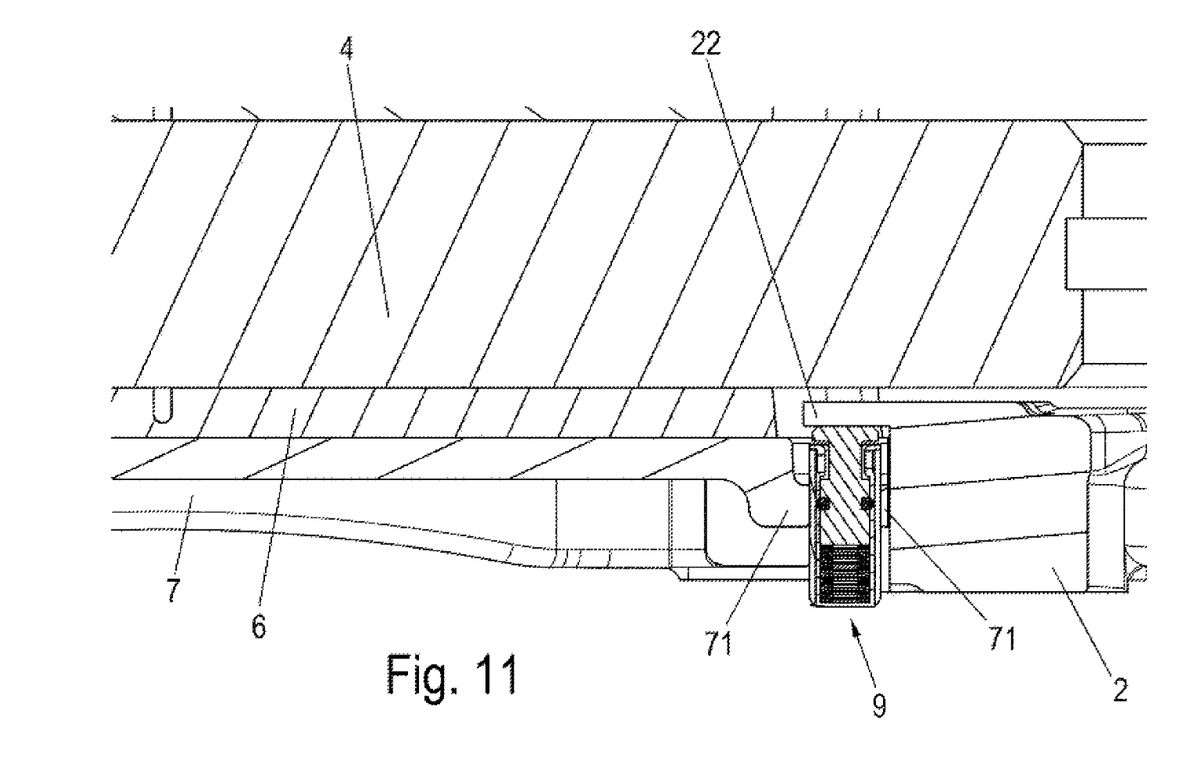

It is a common feature of both design variants that the pressing face 96, 96" can be supported on an end side of the outer casing 91, 91", which end side faces the supporting face 22, and is thus first of all pressed onto that end side of the outer casing 91, 91" which faces the supporting face 22 during a brake application operation. And, with advancing lining wear, as shown in FIGS. 9 to 11, the restoring elements 9, 9', 9" are pressed further into the receptacle hole 72 of the lining carrier 7. This "automatic wear adjustment" of the restoring elements 9, 9', 9" is achieved, in particular, by virtue of the fact that the restoring elements 9, 9', 9" are held in a stationary manner in the lining carrier 7 up to a force which acts parallel to the rotational axis of the brake disc 4 and is smaller than the brake application force Z which is applied by the brake application device in the case of a braking operation. The restoring elements 9, 9', 9" can therefore be displaced in the receptacle holes 72 relative to the lining carrier 7 only in the case of a force which is exerted on the restoring elements as a consequence of a brake application operation.

In one design variant, in which the restoring devices are provided both in the reaction (rear)-side brake pad and in the application-side brake pad 5, it is advantageous in some circumstances if the restoring devices have restoring forces of different magnitude on the different sides of the brake disc 4. This applies, in particular, when the application-side brake pads 5 are coupled to the brake application device and, in the case of the brake application device being released, the brake pads are withdrawn from the brake disc 4. Here, the restoring elements of the reaction-side brake linings preferably displace the entire caliper and, for this reason, have to overcome the brake caliper displacement force which is produced in the guide system of the brake caliper.

The above-described exemplary embodiments do not restrict the invention, but rather the invention can be modified within the scope of the appended claims.

LIST OF DESIGNATIONS

1 Disc brake
2 Brake carrier
3 Brake caliper
4 Brake disc
5 Brake pad
6 Friction lining (material)
7 Lining carrier
9 Restoring elements
9' Restoring elements
9" Restoring elements
21 Guide face
22 Supporting face
61 Cutout
71 Offset
72 Receptacle hole
91 Outer casing
91' Outer casing
92 Sleeve element
93 Spring
93" Counterplate
94 Restoring head
94" Restoring head
95 Seal
95" Spring
96 Pressing face
96" Pressing face
97 Axle body
98 Indentation
Z Brake application force The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc, comprising:
   a brake carrier;
   a sliding caliper which, in use, straddles the brake disc;
   a brake application device arranged in the caliper to actuate the disc brake by applying a brake application force;
   wherein the brake carrier has guide faces arranged opposite one another in a circumferential direction of the brake disc;
   brake pads, each brake pad comprising a lining carrier and a friction lining, the brake pads being guided displaceably parallel to a rotational axis of the brake disc between the guide faces of the brake carrier, one brake pad being arranged on an application side of the brake disc and another on a reaction side of the brake disc wherein at least the application side brake pad is actuated by the brake application force;
   at least one restoring device configured to support at least the reaction side brake pad having the lining carrier on the brake carrier; and
   wherein the restoring device comprises at least two restoring elements attached to the lining carrier of the reaction side brake pad so as to be guidable displaceably parallel to the rotational axis of the brake disc, wherein each restoring element comprises:
      a sleeve mounted in a receptacle hole of the lining carrier so as to be displaceable parallel to the rotational axis of the brake disc, and
      a restoring head arranged to protrude from the sleeve toward the brake disc, the restoring head being restorable elastically counter to a predefined force, wherein the restoring head is supported on a supporting face which protrudes from a guide face in the circumferential direction of the brake disc.

2. The disc brake according to claim 1, wherein the receptacle hole is provided in a depression formed in the lining carrier on an outer edge region in the circumferential direction of the brake disc.

3. The disc brake according to claim 1, wherein the friction lining of the brake pad includes cut outs, each cut out extending at least partially around a respective one of the two restoring elements.

4. The disc brake according to claim 1, wherein an outer casing of each restoring element is configured as a clamping sleeve.

5. The disc brake according to claim 1, wherein an outer casing of each restoring element has a knurled surface portion.

6. The disc brake according to claim 1, wherein the restoring head comprises an axle body extending into an outer casing, and a pressing face arranged at one end perpendicular to a longitudinal length of the axle body.

7. The disc brake according to claim 6, wherein the axle body is held in an oversprung manner in the outer casing.

8. The disc brake according to claim 6, wherein the axle body is supported on at least one spring mounted in the outer casing.

9. The disc brake according to claim 8, wherein the at least one spring is a helical or disc spring.

10. The disc brake according to claim 6, wherein the pressing face is supportable on an end side of the outer casing, said end side facing the supporting face.

11. The disc brake according to claim 1, wherein the at least two restoring elements are configured to be held stationary in the lining carrier up to a defined force that acts parallel to the rotational axis of the brake disc and is less than the brake application force applied by the brake application device during a braking operation.

12. The disc brake according to claim 1, wherein the restoring device is configured to have a restoring force that differs in magnitude between the reaction side brake pad and the application-side brake pad.

13. A brake pad for a sliding caliper disc brake equipped with a brake application device that applies a brake application force during braking operation, the brake pad comprising:
   a lining carrier;
   a friction lining arranged on one side of the lining carrier;
   at least two restoring elements attached to the lining carrier in circumferential edge regions thereof, wherein each restoring element is configured to be displaceably guidable parallel to a rotational axis of a brake disc, wherein each restoring element comprises:
      a sleeve mounted in a receptacle hole of the lining carrier so as to be displaceable parallel to the rotational axis of the brake disc, and
      a restoring head arranged to protrude from the sleeve toward the brake disc, the restoring head being restorable elastically counter to a predefined force, wherein the restoring head is supported on a supporting face which protrudes from a guide face in the circumferential direction of the brake disc.

14. The brake pad according to claim 13, wherein the receptacle hole is provided in a depression formed in the lining carrier on an outer edge region in the circumferential direction of the brake disc.

15. The brake pad according to claim 14, wherein the friction lining of the brake pad includes cut outs, each cut out extending at least partially around a respective one of the two restoring elements.

16. The brake pad according to claim 15, wherein an outer casing of each restoring element is configured as a clamping sleeve.

17. The brake pad according to claim 15, wherein an outer casing of each restoring element has a knurled surface portion.

18. The brake pad according to claim 15, wherein the restoring head comprises an axle body extending into an outer casing, and a pressing face arranged at one end perpendicular to a longitudinal length of the axle body.

* * * * *